United States Patent
Wang et al.

(10) Patent No.: US 12,353,633 B2
(45) Date of Patent: Jul. 8, 2025

(54) TEMPORAL SEQUENCE ALIGNMENT METHOD FOR GESTURE TRAINING DATA

(71) Applicant: KaiKuTek Inc., Taipei (TW)

(72) Inventors: Hung-Ju Wang, Taipei (TW); Tsung-Ming Tai, Taichung (TW); Wen-Jyi Hwang, Taipei (TW); Chun-Hsuan Kuo, San Diego, CA (US); Mike Chun-Hung Wang, Taipei (TW)

(73) Assignee: KAIKUTEK INC., Taipei (TW)

( * ) Notice: Subject to any disclaimer, the term of this patent is extended or adjusted under 35 U.S.C. 154(b) by 756 days.

(21) Appl. No.: 17/717,862

(22) Filed: Apr. 11, 2022

(65) Prior Publication Data
US 2023/0324998 A1    Oct. 12, 2023

(51) Int. Cl.
G06F 3/01          (2006.01)
G06V 10/774        (2022.01)
G06V 10/82         (2022.01)

(52) U.S. Cl.
CPC .......... G06F 3/017 (2013.01); G06V 10/7747 (2022.01); G06V 10/82 (2022.01)

(58) Field of Classification Search
None
See application file for complete search history.

(56) References Cited

FOREIGN PATENT DOCUMENTS

| | | |
|---|---|---|
| CN | 105027190 A | 11/2015 |
| TW | 202111596 A | 3/2021 |

OTHER PUBLICATIONS

Akl et al. ("Accelerometer-Based Gesture Recognition via Dynamic-Time Warping, Affinity Propagation, and Compressive Sensing") , (Year: 2010).*

* cited by examiner

*Primary Examiner* — Chan S Park
*Assistant Examiner* — Elisa M Rice
(74) *Attorney, Agent, or Firm* — RABIN & BERDO, P.C.

(57) ABSTRACT

A temporal sequence alignment method includes the following steps: receiving gesture training data and gesture sample data; wherein the gesture training data includes multiple training frames and multiple training soft labels, and the gesture sample data includes multiple sample frames and multiple sample soft labels; compressing the training frames to generate a compressed training frame; compressing the sample frames to generate a compressed sample frame; calculating an alignment model of the compressed training frame and the compressed sample frame; aligning the sample soft labels to multiple aligned soft labels according to the alignment model; generating an aligned training data according to the gesture sample data and the aligned soft labels. The present invention uses the aforementioned steps to calibrate the sample soft labels of the gesture sample data, allowing a gesture recognition system to minimize time discrepancy for recognizing a gesture.

10 Claims, 10 Drawing Sheets

TEMPORAL SEQUENCE ALIGNMENT METHOD FOR GESTURE TRAINING DATA

BACKGROUND OF THE INVENTION

1. Field of the Invention

The present invention relates to a temporal sequence alignment method for gesture training data, more particularly a temporal sequence alignment method for gesture training data that allows a gesture recognition system to minimize temporal discrepancy of gesture recognitions.

2. Description of the Related Art

As technology advances, electronics interact with humans more and more intimately on a daily basis. A part of electronics in market now starts to have action recognizing abilities, and more particularly, gesture recognizing abilities. However, a technology that enables electronics to recognize hand gestures of a user is yet perfect. A gesture recognition system still has some unsolved problems, namely, how to recognize a hand gesture at a most accurate trigger time. The hand gesture here refers to any arbitrary motions a hand is able to perform, such as writing or drawing shapes.

For example, a gesture recognition system in an electronic device is responsible for recognizing any one of multiple shapes stored within a gesture-motion database. When a user's hand draws a shape of a moon within a sensing area, the gesture recognition system will continuously calculate and observe how the hand moves in real time, in attempts to both decrease chances of falsely determining the hand gesture. To make this calculation and recognition process more efficient, the gesture recognition system often uses an artificial intelligence (AI), wherein the AI is trained to help recognize the hand gestures.

Currently the AI of the gesture recognition system is mostly trained by using Deep Learning methods such as Convolutional Neural Network (CNN) or Long Short-Term Memory (LSTM). Although these two Deep Learning methods are effective in training a Range-Doppler Imaging (RDI) system to correctly recognize hand gestures, or in other words, successfully decreasing chances of falsely determining hand gestures, these two Deep Learning methods however fail to optimize the speed of correctly recognizing hand gestures. Furthermore, currently the speed of correctly recognizing hand gestures is still yet to be optimized even by using cross entropy training methods.

If the exact moment when the gesture recognition system completely recognizes the hand gesture is called a trigger point, then when the trigger point is earlier or later than the actual moment a user just finishes performing a gesture, user experience of using the electronic device is negatively impacted. In other words, if the gesture recognition system fails to recognize the hand gesture at the best time, the user might need to wait longer or repeatedly perform the same hand gesture for a hand gesture recognition result.

In this context, time discrepancy refers to the time difference between the moment when the user finishes drawing the shape and the moment when the gesture recognition system successfully recognizes the hand gesture. If this time discrepancy is minimized, theoretically the user experience can be improved. Currently, training the AI by first soft labeling time or a progression of the hand gesture is still insufficient to minimize this time discrepancy.

SUMMARY OF THE INVENTION

The present invention provides a temporal sequence alignment method for gesture training data. The temporal sequence alignment method for gesture training data of the present invention is a pre-processing method for training an artificial intelligence (AI) network.

The temporal sequence alignment method is executed by a processing unit, and the temporal sequence alignment method for gesture training data includes the following steps:
  receiving gesture training data; wherein the gesture training data includes multiple training frames and multiple training soft labels;
  compressing the training frames of the gesture training data to generate a compressed training frame;
  receiving gesture sample data; wherein the gesture sample data includes multiple sample frames and multiple sample soft labels;
  compressing the sample frames of the gesture sample data to generate a compressed sample frame;
  calculating an alignment model of the compressed training frame and the compressed sample frame through Dynamic Time Warping (DTW);
  aligning the sample soft labels to multiple aligned soft labels according to the alignment model;
  generating an aligned training data according to the gesture sample data and the aligned soft labels.

The alignment model establishes a correlation between the sample soft labels and the training soft labels. Once calibrated from the gesture sample data, the aligned soft labels will have higher correlation to an actual gesture described by the gesture sample data. The present invention is a pre-processing method for training an AI network, and more particularly, the aligned training data is used to train the AI network. The AI network trained by the aligned training data would be able to further train a gesture recognition system to successfully minimize time discrepancy for recognizing hand gestures, thus allowing the gesture recognition system to efficiently recognize a hand gesture. The present invention is able to lead to this previously impossible result because the present invention uses the aforementioned steps to calibrate the sample soft labels of the gesture sample data. This allows the aligned soft labels to more closely represent an actual progress of the gesture.

DETAILED DESCRIPTION OF THE INVENTION

Figure 1:
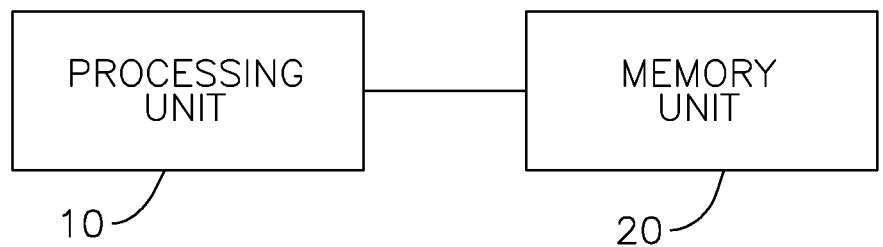
FIG. 1 is a block diagram of a temporal sequence alignment method for gesture training data of the present invention.

With reference to FIG. 1, the present invention provides a temporal sequence alignment method for gesture training data. The temporal sequence alignment method for gesture training data of the present invention is executed by a processing unit 10. In an embodiment of the present invention, the processing unit 10 is electrically connected with a memory unit 20. The memory unit 20 stores gesture training data, multiple gesture sample data, and an artificial intelligence (AI) network. The AI network is geared towards training for a gesture recognition system, allowing the gesture recognition system to efficiently recognize a gesture from a user. To efficiently recognize the gesture from the user means to minimize time discrepancy for the gesture recognition system to correctly recognize the gesture from the user, thus optimizing a speed for the gesture recognition system to correctly recognize the gesture from the user. Furthermore, in order to minimize the time discrepancy, the gesture recognition system should be trained to know when exactly to correctly start recognizing the hand gesture. If an exact moment when the gesture recognition system completely recognizes the hand gesture is called a trigger point, then when the trigger point is earlier or later than an actual moment a user just finishes performing a gesture, user experience of using the electronic device is negatively impacted.

In this context, the time discrepancy, or a temporal discrepancy, refers to time difference between a moment when the user draws the shape and another moment when the gesture recognition system successfully recognizes the gesture. To calculate the time discrepancy, the gesture training data for the gesture recognition system often adds time labels, wherein the time labels correlate to a progress of movements of the gesture making a shape and time spent of the gesture making a shape. When the trigger point is earlier or later than the actual moment the user just finishes performing the gesture, the trigger point is yet to be optimized to be triggered exactly when the user finishes the gesture. In other words, only when the trigger point is triggered exactly when the user finishes the gesture will the gesture recognition system be able to provide the user with the best experience for gesture recognition.

The present invention is able to align and calibrate the gesture sample data according to the gesture training data, in other words, the present invention aligns temporal sequence of the gesture sample data according to the gesture training data in order to calibrate a gesture training data. Afterwards, the gesture training data is used to train the AI network, and then the AI network is used to train the gesture recognition system. The gesture recognition system would be able to trigger the trigger point at the best time to efficiently and successfully recognize the gesture. This way the present invention achieves a previously impossible goal of optimizing the trigger point to the best time and minimizing the time discrepancy.

When the temporal sequence alignment method for gesture training data of the present invention is executed, the processing unit 10 loads the gesture training data and one of the gesture sample data from the multiple gesture sample data stored in the memory unit 20.

Figure 2:
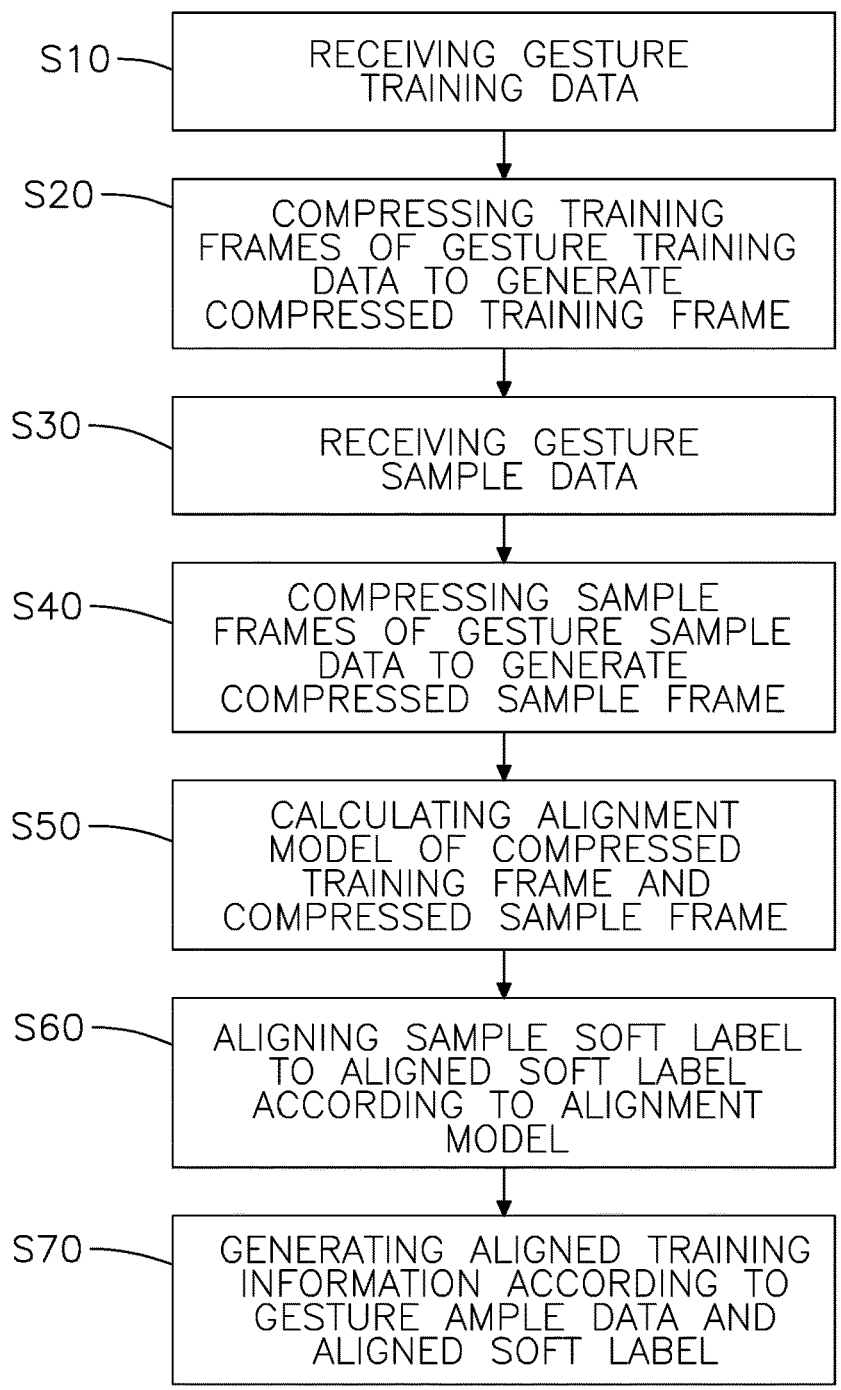
FIG. 2 is a flow chart of the temporal sequence alignment method for gesture training data of the present invention.

With reference to FIG. 2, the temporal sequence alignment method for gesture training data of the present invention includes the following steps:

step S10: receiving the gesture training data; wherein the gesture training data includes multiple training frames and multiple training soft labels;

step S20: compressing the training frames of the gesture training data to generate a compressed training frame;

step S30: receiving the gesture sample data; wherein the gesture sample data includes multiple sample frames and multiple sample soft labels;

step S40: compressing the sample frames of the gesture sample data to generate a compressed sample frame;

step S50: calculating an alignment model of the compressed training frame and the compressed sample frame through Dynamic Time Warping (DTW);

step S60: aligning the sample soft labels to multiple aligned soft labels according to the alignment model; and step S70: generating an aligned training data according to the gesture sample data and the aligned soft labels.

The aligned training data is then used by the processing unit 10 to train the AI network stored inside the memory unit 20. The alignment model establishes a correlation between the sample soft labels and the training soft labels. Once calibrated from the gesture sample data, the aligned soft labels will have higher correlation to an actual gesture described by the gesture sample data. Before the AI network is used to train the gesture recognition system, the present invention uses the aforementioned steps to calibrate the sample soft labels of the gesture sample data. This allows the aligned soft labels to more closely represent an actual progress of the gesture. As a result, the present invention allows the AI network to train the gesture recognition system, allowing the gesture recognition system to minimize the time discrepancy, and optimizing efficiency in correctly recognizing the gesture.

A temporal sequence alignment refers to an execution of steps S50 to S70, wherein temporal sequences of the gesture are aligned for the AI network to understand a progression of the gesture.

In the present embodiment, the gesture training data is the best training model for training to recognize the gesture of the user. The training soft labels are time labels for recognizing the progression of the gesture, and the training soft labels are the most accurate time labels for recognizing the progression of the gesture.

Figure 3:
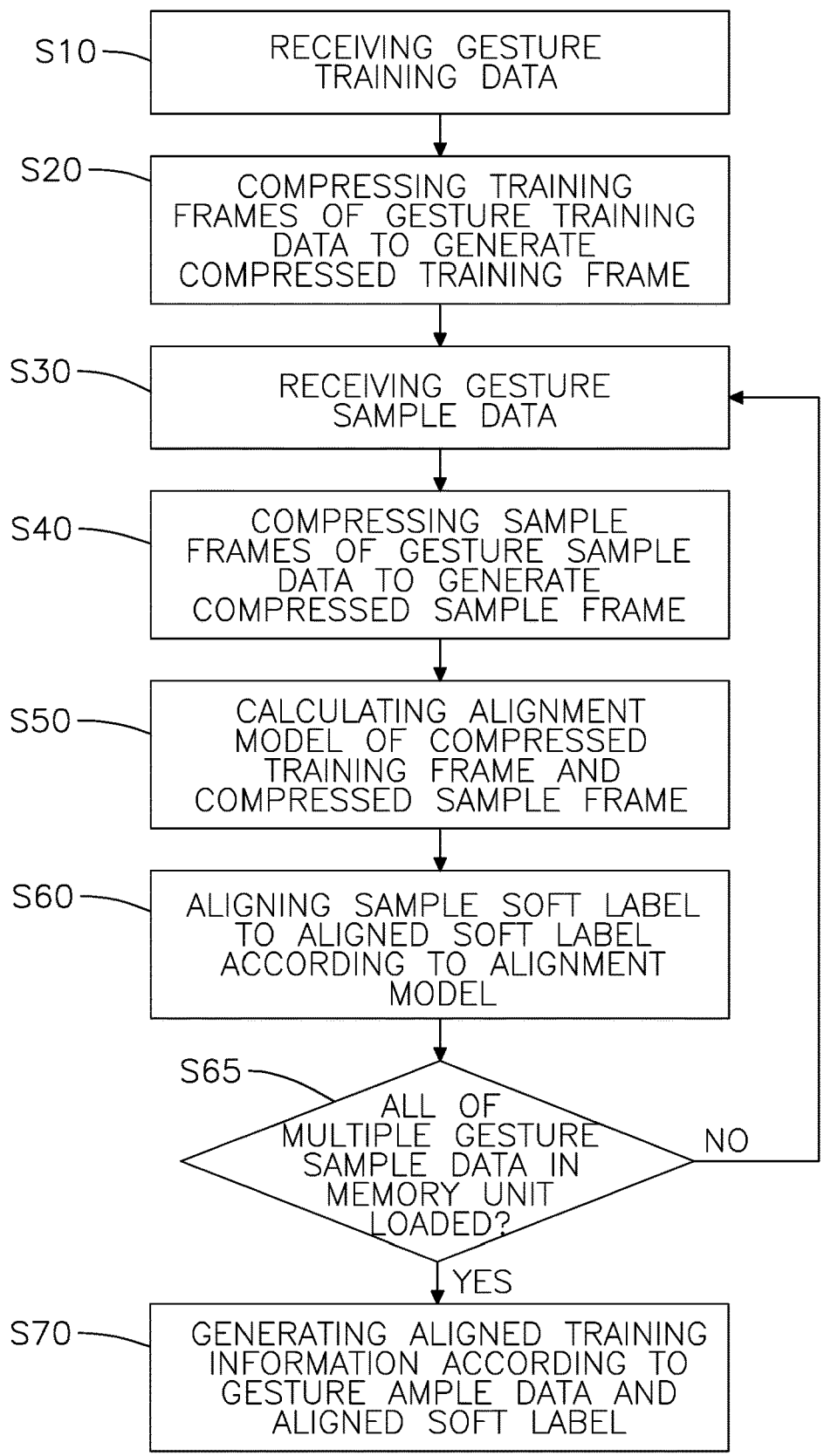
FIG. 3 is another flow chart of the temporal sequence alignment method for gesture training data of the present invention.

With reference to FIG. 3, in the present embodiment, between step S60 and step S70, the method includes the following step:

step S65: determining whether all of the multiple gesture sample data in the memory unit 20 have been loaded;

when determining all of the multiple gesture sample data in the memory unit 20 have yet been loaded, executing step S30 to load another one of the gesture sample data from the multiple gesture sample data stored in the memory unit 20; and when determining all of the multiple gesture sample data in the memory unit 20 have been loaded, executing step S70.

Figure 4:
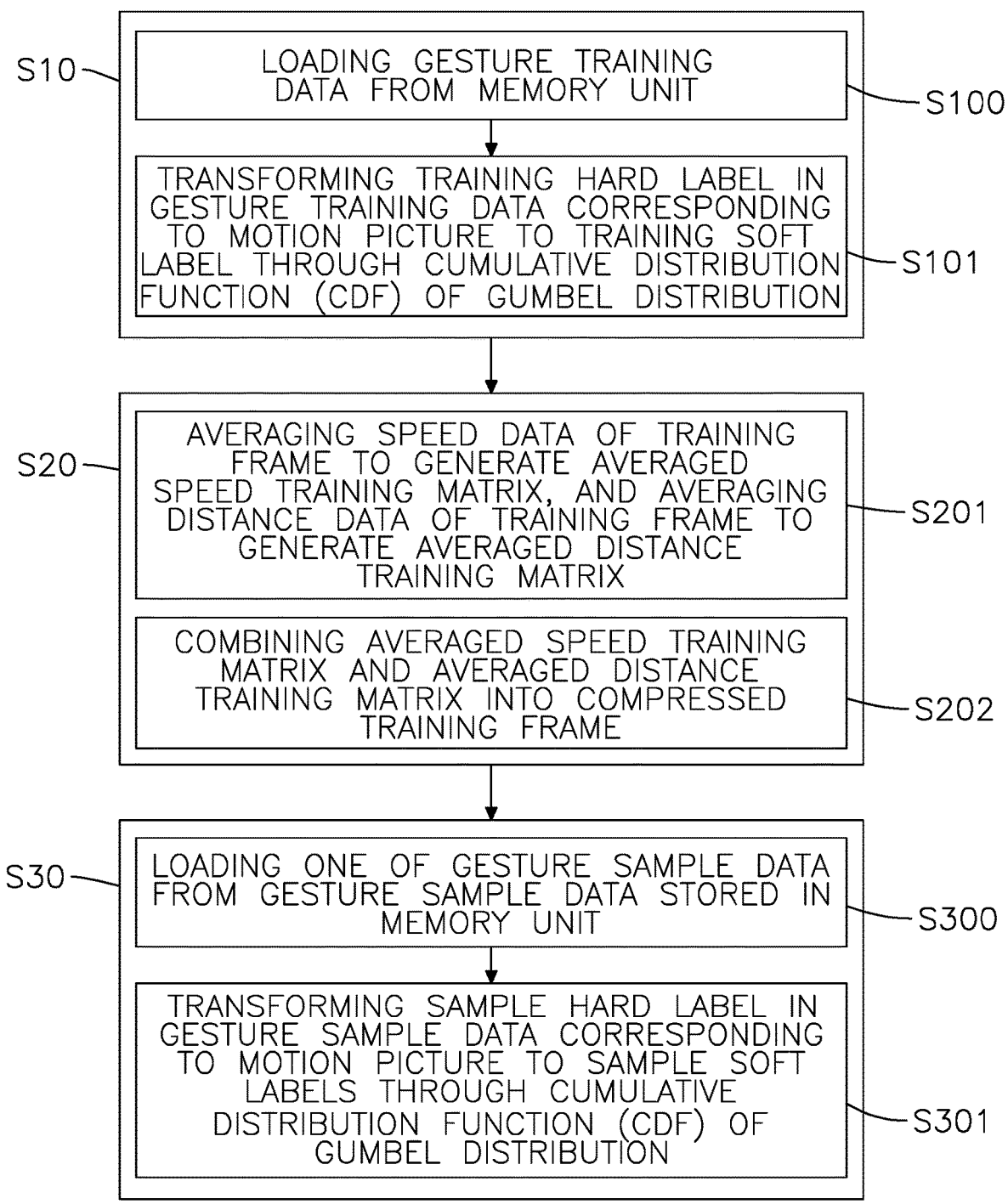
FIG. 4 is another flow chart of the temporal sequence alignment method for gesture training data of the present invention.
Figure 5:
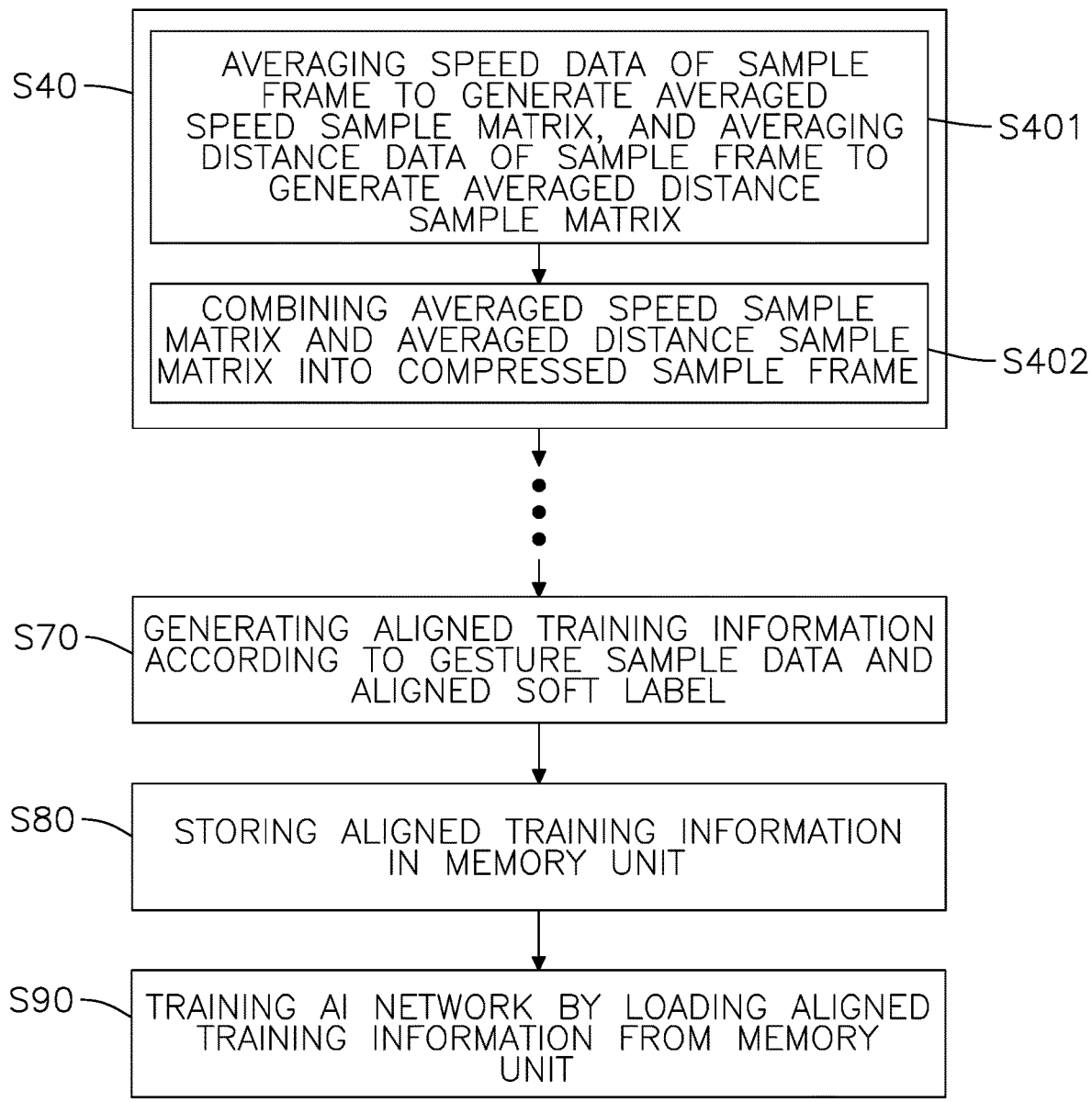
FIG. 5 is another flow chart of the temporal sequence alignment method for gesture training data of the present invention.

With reference to FIGS. 4 and 5, in the present embodiment, step S10 further includes the following sub-steps:

step S100: loading the gesture training data from the memory unit 20; and step S101: transforming multiple training hard labels in the gesture training data corresponding to a motion picture to the training soft labels through a Cumulative Distribution Function (CDF) of Gumbel distribution.

Similarly, step S30 further includes the following sub-steps:

step S300: loading one of the gesture sample data from the multiple gesture sample data stored in the memory unit 20; and step S301: transforming multiple sample hard labels in the gesture sample data corresponding to the motion picture to the sample soft labels through the CDF of Gumbel distribution.

Furthermore, step S20 includes the following sub-steps:

step S201: averaging speed data of the training frames to generate an averaged speed training matrix, and averaging distance data of the training frames to generate an averaged distance training matrix; and step S202: combining the averaged speed training matrix and the averaged distance training matrix into the compressed training frame.

Similarly, step S40 includes the following sub-steps:

step S401: averaging speed data of the sample frames to generate an averaged speed sample matrix, and averaging distance data of the sample frames to generate an averaged distance sample matrix; and step S402: combining the averaged speed sample matrix and the averaged distance sample matrix into the compressed sample frame.

After the processing unit 10 executes step S70, the processing unit 10 executes a step of:

Step S80: storing the aligned training data in the memory unit 20.

When the processing unit 10 prepares to train the AI network, the processing unit 10 executes a step of:

Step S90: training the AI network by loading the aligned training data from the memory unit 20.

Figure 6A:
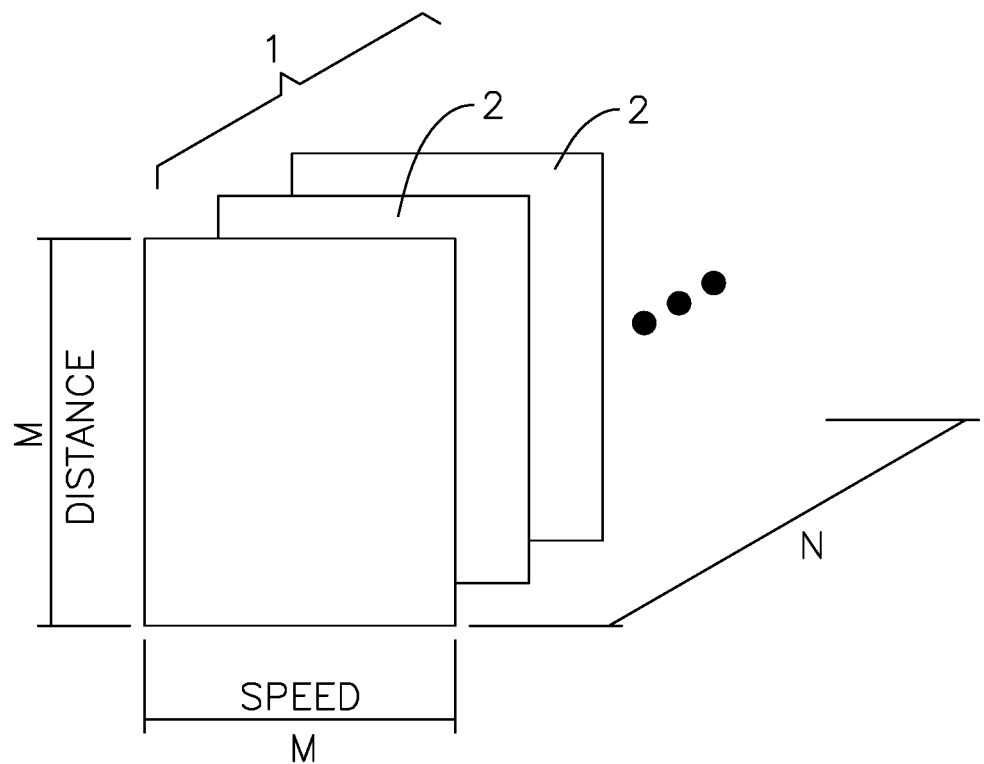
FIG. 6A is a perspective view of gesture training data of the temporal sequence alignment method for gesture training data of the present invention.
Figure 6B:
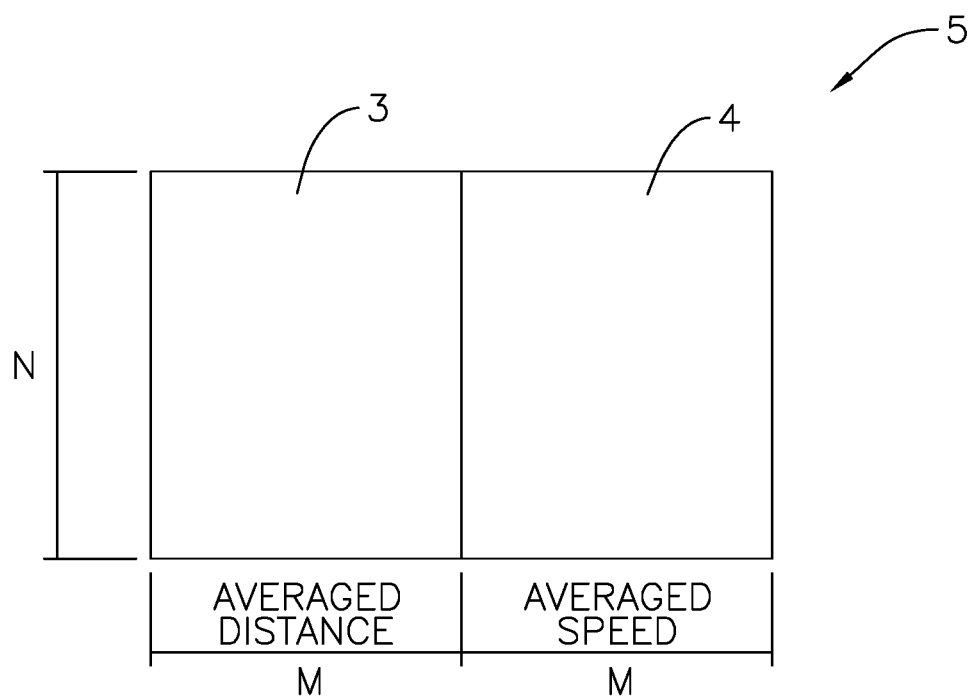
FIG. 6B is a perspective view of a compressed training frame of the temporal sequence alignment method for gesture training data of the present invention.

With reference to FIGS. 6A and 6B, FIG. 6A presents a perspective view of how the gesture training data 1 received in step S10 includes the training frames 2. The training frames 2 and the sample frames are in fact input data of a Range-Doppler Imaging (RDI) system. Furthermore, the input data respectively for the training frames 2 and the sample frames are in fact pre-processed, transforming original data of the RDI system into the input data with only speed and distance information. This is why matrices of the training frames 2 and the sample frames only respectively consist of speed data and distance data.

In the present embodiment, the original data of the RDI system contains data relating to distance and frequency shifts of the gesture. Using known Doppler effect equations, data relating to distance and moving speed of the gesture can be easily calculated. Here the RDI system is an imaging system used for gesture recognizing. In the present embodiment, the RDI system pre-stores the aforementioned data all in the memory unit 20 for the present invention to use. The training frames 2 consist of N individual training frames. Each of the individual training frames has M*M elements in a matrix. Similarly, the sample frames consist of N individual sample frames. Each of the individual sample frames has M*M elements in a matrix. By M*M elements in a matrix, it means the matrix consists of M columns and M rows. The M and N here are both integers greater than one. More particularly, in each of the matrices for the training frames 2 and the sample frames, the columns each represent a different speed, and the rows each represent a different distance. In other words, in each of the matrices for both the training frames 2 and the sample frames, columns represent a speed dimension, and rows represent a distance dimension.

FIG. 6B presents a perspective view of how in step S20 the training frames 2 are compressed to become the compressed training frame 5. The compressed training frame 5, more particularly, is generated by combining the averaged distance training matrix 3 and the averaged speed training matrix 4. The processing unit 10 calculates the averaged distance training matrix 3 by first loading the gesture training data 1 shown in FIG. 6A, and then averaging the distance data of the distance dimension in the training frames 2 a total of M times. Similarly, the processing unit 10 calculates the averaged speed training matrix 4 by first loading the gesture training data 1 shown in FIG. 6A, and then averaging the speed data of the speed dimension in the training frames 2 a total of M times.

The averaged speed training matrix and the averaged distance training matrix mentioned above are each respectively an M*N matrix. The compressed training frame is a 2M*N matrix. Similarly, the averaged speed sample matrix and the averaged distance sample matrix mentioned above are each respectively an M*N matrix. The compressed sample frame is a 2M*N matrix. The 2M notation simply stands for having double an amount of M. The alignment model is an N*N matrix. In the present embodiment, the averaged speed training matrix and the averaged distance training matrix each respectively contain M columns and N rows. The compressed training frame contains 2M columns and N rows. Similarly, the averaged speed sample matrix and the averaged distance sample matrix each respectively contain M columns and N rows. The compressed sample frame contains 2M columns and N rows. With respect to the above mentioned information, the alignment model in the present embodiment would logically contain N columns and N rows.

Figure 7:
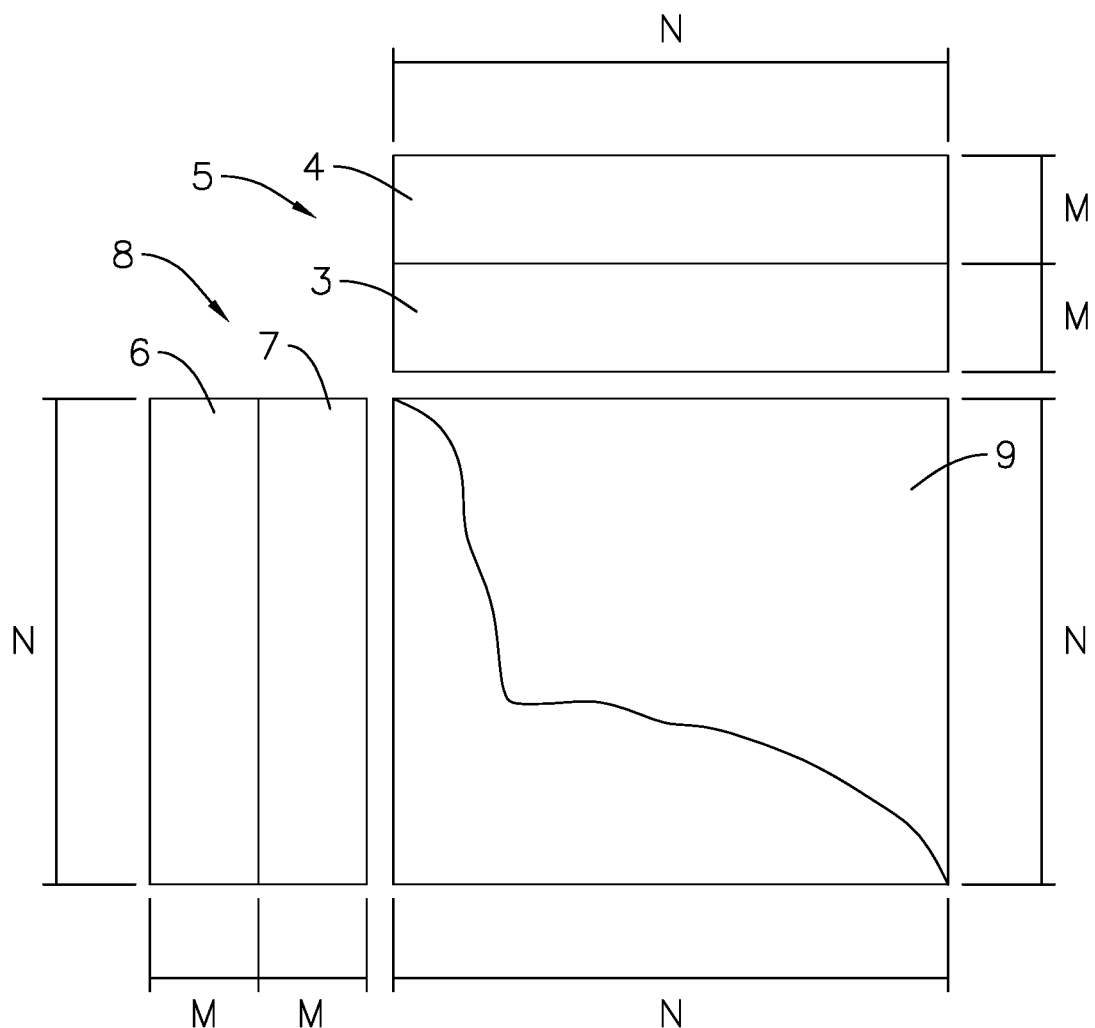
FIG. 7 is a perspective view of an alignment model of the temporal sequence alignment method for gesture training data of the present invention.

With reference to FIG. 7, similarly, the compressed sample frame 8, more particularly, is generated by combining the averaged distance sample matrix 6 and the averaged speed sample matrix 7. The alignment model 9 is calculated by the compressed training frame 5 that has been rotation transformed and the compressed sample frame 8. When the compressed training frame 5 and the compressed sample frame 8 are identical, the alignment model 9 will display a straight diagonal line. When the compressed training frame 5 and the compressed sample frame 8 are different, the alignment model 9 will display a fluctuating diagonal line as presented in FIG. 7. This way, when the alignment model 9 is calculated by the DTW, the alignment model 9 would be able to display a correlation between the compressed training frame 5 and the compressed sample frame 8. From how the fluctuating diagonal line fluctuates in the alignment model 9, an extent of how the compressed training frame 5 and the compressed sample frame 8 are correlated will show, and this extent will also reflect how the sample soft labels deviate from the training soft labels. By teaching the AI network how the sample soft labels deviate from the training soft labels, such deviation can be minimized.

Figure 8A:
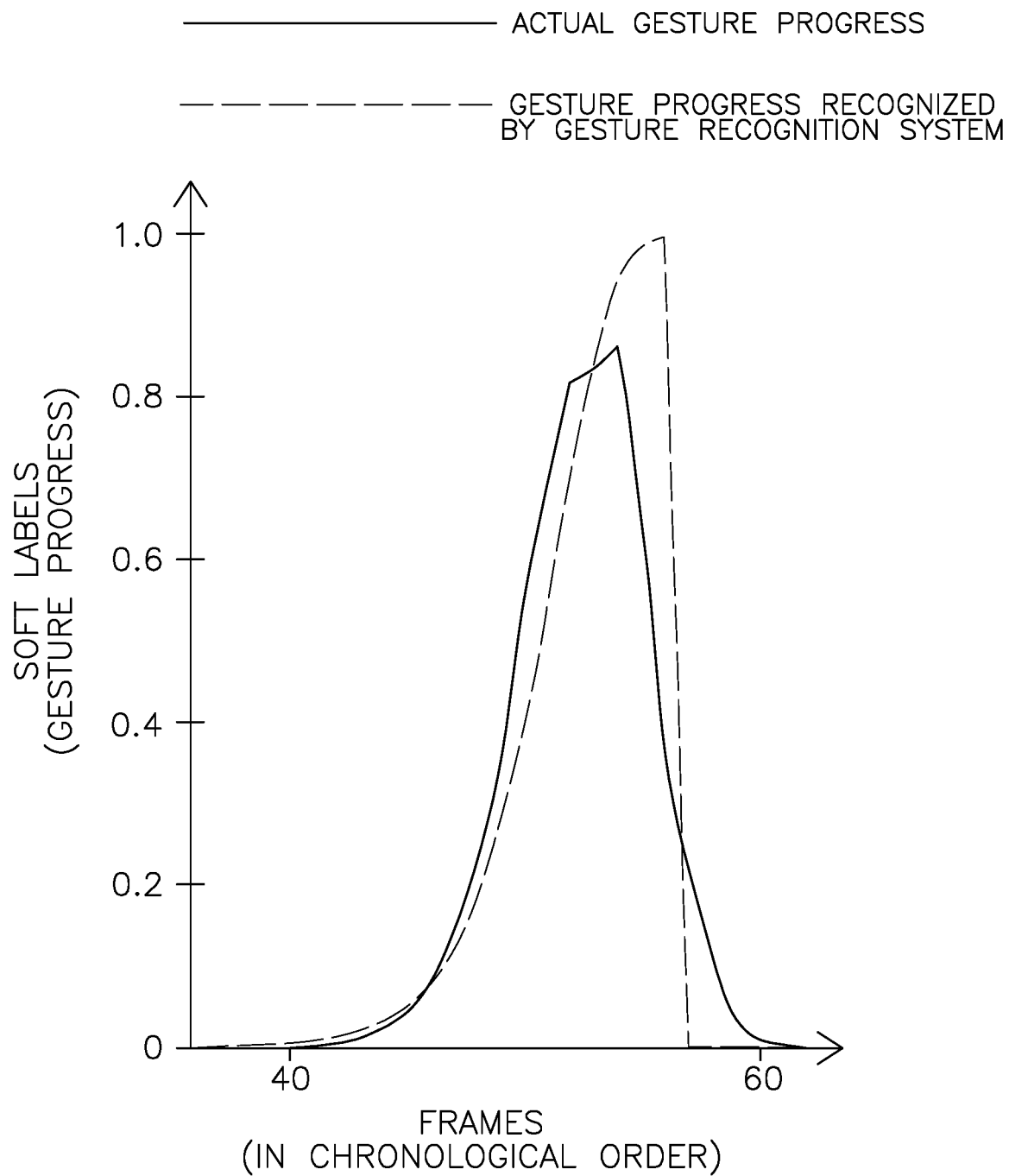
FIG. 8A is a perspective view of progression of gesture recognizing for a gesture recognition system before utilizing the present invention.
Figure 8B:
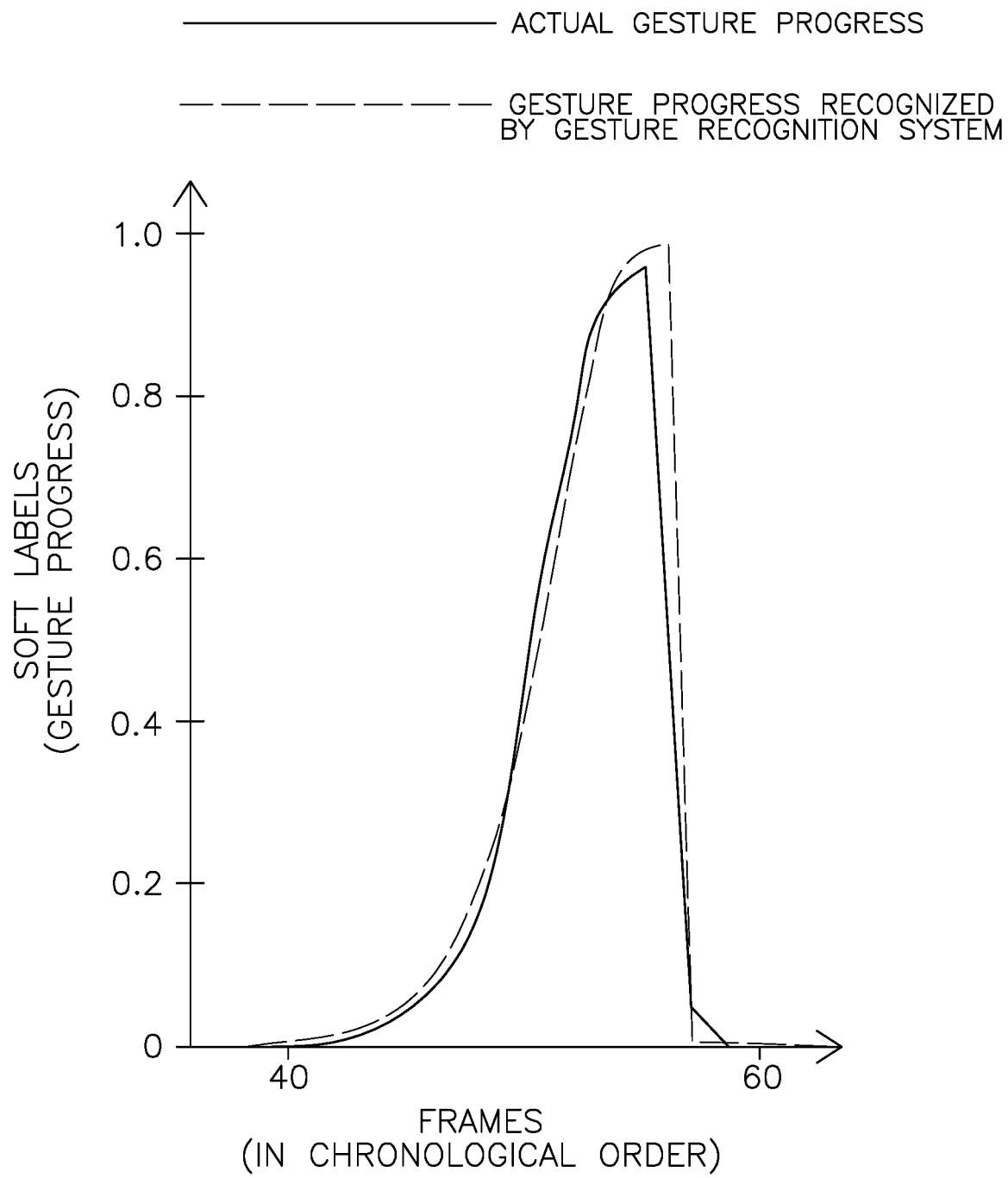
FIG. 8B is a perspective view of progression of gesture recognizing for the gesture recognition system after utilizing the present invention.

With reference to FIGS. 8A and 8B, FIG. 8A presents a perspective view of a progression of gesture recognizing for the gesture recognition system before utilizing the present invention. FIG. 8B presents a perspective view of a progression of gesture recognizing for the gesture recognition system after utilizing the present invention. FIGS. 8A and 8B are presented to demonstrate an effectiveness of the present invention. FIGS. 8A and 8B respectively include a horizontal axis corresponding to frames in chronological order and a vertical axis corresponding to the progression of the gesture, or a gesture progress, represented as a value. The frames in chronological order show the motion picture of the gesture of the user. Here the progression of the gesture is discussed in terms of a gesture progress recognized by the gesture recognition system and an actual gesture progress. When the gesture progress recognized by the gesture recognition system is 1.0, the gesture at the very moment is 100% completely recognized, and when the gesture progress recognized by the gesture recognition system is 0.8, the gesture at the very moment is 80% partially recognized. The gesture progress also corresponds to the soft labels of temporal data of the frames.

With reference to FIG. 8A, some differences and the time discrepancy exist between the gesture progress recognized by the gesture recognition system and the actual gesture progress. In other words, the gesture progress recognized by the gesture recognition system is visibly lagging from the actual gesture progress.

With reference to FIG. 8B, differences barely exist between the actual gesture progress and the gesture progress recognized by the gesture recognition system, and the time discrepancy is significantly reduced between the actual gesture progress and the gesture progress recognized by the gesture recognition system. In other words, in this case, the gesture progress recognized by the gesture recognition system is almost synchronized with the actual gesture progress. In comparison to FIG. 8A, after the AI network is calibrated and trained by the present invention, the gesture recognition system further trained by the AI network is able to significantly reduce the time discrepancy between the actual gesture progress and the gesture progress recognized by the gesture recognition system. This is sufficient in proving the effectiveness of the present invention in fitting the gesture progress recognized by the gesture recognition system and the actual gesture progress through the temporal sequence alignment.

What is claimed is:

1. A temporal sequence alignment method for gesture training data, comprising steps of:
    step S10: receiving gesture training data; wherein the gesture training data comprises multiple training frames and multiple training soft labels;
    step S20: compressing the training frames of the gesture training data to generate a compressed training frame;
    step S30: receiving gesture sample data; wherein the gesture sample data comprises multiple sample frames and multiple sample soft labels;
    step S40: compressing the sample frames of the gesture sample data to generate a compressed sample frame;
    step S50: calculating an alignment model of the compressed training frame and the compressed sample frame through Dynamic Time Warping (DTW);
    step S60: aligning the sample soft labels to multiple aligned soft labels according to the alignment model; and
    step S70: generating an aligned training data according to the gesture sample data and the aligned soft labels.

2. The temporal sequence alignment method for the gesture training data as claimed in claim 1, executed by a processing unit; wherein the processing unit is electrically connected to a memory unit, and the memory unit stores the gesture training data, multiple gesture sample data, and an artificial intelligence (AI) network; wherein the temporal sequence alignment method further comprises steps of:
    when executing step S10, loading the gesture training data from the memory unit by the processing unit;
    when executing step S30, loading one of the gesture sample data from the multiple gesture sample data stored in the memory unit by the processing unit;
    after executing step S70, storing the aligned training data in the memory unit by the processing unit; and
    when training the AI network, loading the aligned training data from the memory unit by the processing unit.

3. The temporal sequence alignment method for the gesture training data as claimed in claim 2, wherein before step S70 is executed, the temporal sequence alignment method further comprises the following step:
    step S65: determining whether all of the multiple gesture sample data in the memory unit have been loaded;
    when determining all of the multiple gesture sample data in the memory unit have yet been loaded, executing step S30 to load another one of the gesture sample data from the multiple gesture sample data stored in the memory unit;
    when determining all of the multiple gesture sample data in the memory unit have been loaded, executing step S70.

4. The temporal sequence alignment method for the gesture training data as claimed in claim 1, wherein step S10 further comprises the following sub-step:
    step S101: transforming multiple training hard labels in the gesture training data corresponding to a motion picture to the training soft labels through a Cumulative Distribution Function (CDF) of Gumbel distribution.

5. The temporal sequence alignment method for the gesture training data as claimed in claim 1, wherein step S30 further comprises the following sub-step:
    step S301: transforming multiple sample hard labels in the gesture sample data corresponding to a motion picture to the sample soft labels through a Cumulative Distribution Function (CDF) of Gumbel distribution.

6. The temporal sequence alignment method for the gesture training data as claimed in claim 1, wherein:
    the training frames consist of N individual training frames, and each of the individual training frames has M*M elements in a matrix;
    the sample frames consist of N individual sample frames, and each of the individual sample frames has M*M elements in a matrix;
    the M and N are both integers greater than one;
    in each of the matrices for both the training frames and the sample frames, columns represent a speed dimension, and rows represent a distance dimension.

7. The temporal sequence alignment method for the gesture training data as claimed in claim 6, wherein step S20 further comprises the following sub-steps:
    step S201: averaging speed data of the training frames to generate an averaged speed training matrix, and averaging distance data of the training frames to generate an averaged distance training matrix; and
    step S202: combining the averaged speed training matrix and the averaged distance training matrix into the compressed training frame;
    wherein the averaged speed training matrix and the averaged distance training matrix are each respectively an M*N matrix, and the compressed training frame is a 2M*N matrix; the 2M notation stands for having double an amount of M.

8. The temporal sequence alignment method for the gesture training data as claimed in claim 7, wherein step S40 further comprises the following sub-steps:
    step S401: averaging speed data of the sample frames to generate an averaged speed sample matrix, and averaging distance data of the sample frames to generate an averaged distance sample matrix;

step S402: combining the averaged speed sample matrix and the averaged distance sample matrix into the compressed sample frame;

wherein the averaged speed sample matrix and the averaged distance sample matrix are each respectively an M*N matrix, and the compressed sample frame is a 2M*N matrix.

9. The temporal sequence alignment method for the gesture training data as claimed in claim 8, wherein
the alignment model is an N*N matrix.

10. The temporal sequence alignment method for the gesture training data as claimed in claim 1, wherein
the gesture training data is a training model for training to recognize a gesture; the training soft labels are time labels for recognizing a progression of the gesture.

\* \* \* \* \*